(12) United States Patent
Yang

(10) Patent No.: US 11,036,099 B2
(45) Date of Patent: Jun. 15, 2021

(54) ARRAY SUBSTRATE COMPRISING A PLURALITY OF TOUCH SIGNAL LINES HAVING MULTIPLE NON-TOUCH-SIGNAL-TRANSMITTING LINES COMPRISING A CURVED SECTION CURVING AND DETOURING AROUND A THROUGH HOLE

(71) Applicant: Wuhan China Star Optoelectronics Technology Co., Ltd., Hubei (CN)

(72) Inventor: Chengao Yang, Guangdong (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 355 days.

(21) Appl. No.: 16/077,549

(22) PCT Filed: Jan. 30, 2018

(86) PCT No.: PCT/CN2018/074632
§ 371 (c)(1),
(2) Date: Aug. 13, 2018

(87) PCT Pub. No.: WO2018/233296
PCT Pub. Date: Dec. 27, 2018

(65) Prior Publication Data
US 2020/0341573 A1    Oct. 29, 2020

(30) Foreign Application Priority Data

Jun. 20, 2017  (CN) .......................... 201710477496.5

(51) Int. Cl.
G02F 1/1345  (2006.01)
G06F 3/041  (2006.01)
(Continued)

(52) U.S. Cl.
CPC ...... *G02F 1/13452* (2013.01); *G02F 1/13338* (2013.01); *G02F 1/133514* (2013.01);
(Continued)

(58) Field of Classification Search
CPC .................... G02F 2201/12; G02F 1/13629
See application file for complete search history.

(56) References Cited

U.S. PATENT DOCUMENTS

2007/0200993 A1* 8/2007 Aramatsu ......... G02F 1/136286
349/149
2010/0123681 A1 5/2010 Wu et al.
(Continued)

FOREIGN PATENT DOCUMENTS

CN  103454800 A  12/2013
CN  104808375 A  7/2015
(Continued)

*Primary Examiner* — Paul C Lee
(74) *Attorney, Agent, or Firm* — Leong C. Lei

(57) ABSTRACT

An array substrate includes non-touch-signal-transmitting lines that do not have a function of transmitting a touch signal. The non-touch-signal-transmitting lines are parallel with data lines. By connecting the non-touch-signal-transmitting lines with scan lines, the non-touch-signal-transmitting lines may provide electrical connection between the scan lines and a scan line driving circuit so that the scan line driving circuit and a data line driving chip can be arranged on a same one of edge frame parts or two opposite ones of the edge frame parts. Thus, the other ones of the edge frame parts are allowed to have a width of only 0.1-0.3 mm, making it possible to achieve ultra slimming of edge frame for at least two of the edge frame parts.

5 Claims, 3 Drawing Sheets

(51) Int. Cl.
  *G02F 1/1333*   (2006.01)
  *G02F 1/1335*   (2006.01)
  *G02F 1/1362*   (2006.01)
  *G09G 3/36*     (2006.01)

(52) U.S. Cl.
  CPC ...... *G02F 1/136286* (2013.01); *G06F 3/0412* (2013.01); *G06F 3/04164* (2019.05); *G09G 3/3674* (2013.01); *G09G 3/3685* (2013.01)

(56) References Cited

U.S. PATENT DOCUMENTS

| | | | | |
|---|---|---|---|---|
| 2014/0211136 A1* | 7/2014 | Fukuoka | ............ | G02F 1/13394 349/106 |
| 2015/0168758 A1* | 6/2015 | Nakata | ................ | H01L 27/1225 349/43 |
| 2016/0188063 A1* | 6/2016 | Kim | ..................... | G06F 3/0412 345/173 |

FOREIGN PATENT DOCUMENTS

| | | | |
|---|---|---|---|
| CN | 105468202 A | | 4/2016 |
| CN | 106406612 A | * | 2/2017 |
| CN | 106406612 A | | 2/2017 |
| CN | 106710553 A | | 5/2017 |
| CN | 107422509 A | | 12/2017 |

* cited by examiner

ARRAY SUBSTRATE COMPRISING A PLURALITY OF TOUCH SIGNAL LINES HAVING MULTIPLE NON-TOUCH-SIGNAL-TRANSMITTING LINES COMPRISING A CURVED SECTION CURVING AND DETOURING AROUND A THROUGH HOLE

This application claims the priority of Chinese Patent Application No. 201710477496.5 filed on Jun. 20, 2017, titled "ARRAY SUBSTRATE, DISPLAY PANEL, AND DISPLAY DEVICE", the disclosure of which is incorporated herein by reference in its entirety.

BACKGROUND OF THE INVENTION

1. Field of the Invention

The present invention relates to the field of display technology, and more particularly to an array substrate, a display panel, and a display apparatus.

2. The Related Arts

With the continuous innovation, panels are being developed toward thinning, high screen area ratio, ultra slim frame, and even being frame-free. A traditional low-temperature poly-silicon (LTPS) panel may save a wire laying space for a bonding area of a gate integrated circuit (IC) and a fan-out arrangement by directly forming a scan line driving circuit on an array substrate through the array substrate gate driver on array (GOA) technology, so as to realize slim frame. However, since in an array substrate of a liquid crystal panel, the scan lines are generally arranged perpendicular to the data lines, in order to reduce frame wires and thus shrink the dimension of the frame, and to ensure an aesthetic effect of symmetry of the panel, in arranging a scan line driving circuit and a data line driving circuit, it is common to set the scan line driving circuit that loads a scan signal to the scan lines in two lateral frame parts that are on the left and right sides of the array substrate, while the data line driving circuit that loads a data signal to the data lines is arranged in upper frame part or a lower frame part. Nevertheless, the scan line driving circuit and data line driving circuit still need to occupy an amount of width, thereby setting a constraint to an ultra slim frame or a frame-less arrangement of the panel.

Further, to fulfill thinning of a panel, a touch screen is directly combined with a liquid crystal panel (an in-cell arrangement), in which a touch signal line is formed on an array substrate of a liquid crystal panel in order to reduce the thickness of the panel. Specifically, touch signal wires include touch-signal- transmitting wires that transmit the touch signal and non-touch-signal- transmitting wires that do not transmit the touch signal. However, to ensure improved optical performance for such a panel, the non-touch-signal-transmitting must be preserved.

SUMMARY OF THE INVENTION

The present invention provides an array substrate, which allows for further reduction of a size of an edge frame in order to realize frame slimming for the edge frame.

The present invention provides an array substrate. The array substrate comprises a base plate, a plurality of spaced and parallel scan lines, a plurality of spaced and parallel data lines, a plurality of spaced touch signal lines, a data line driving chip, and a scan line driving circuit. The plurality of scan lines are arranged on a surface of the base plate. The plurality of data lines are also arranged on the base plate and the plurality of data lines and the plurality of scan lines are perpendicular but not connected to each other. The plurality of touch signal lines are located on the base plate, and the touch signal lines correspond, in a one to one manner, to and are parallel with the data lines. The plurality of touch signal lines comprise multiple non-touch-signal-transmitting lines, and each of the scan lines is electrically connected to at least one of the non-touch-signal-transmitting lines. The data line driving chip comprises pins that correspond, in a one to one manner, to and are electrically connected to the plurality of data lines. The scan line driving circuit comprises pins that are electrically connected to the non-touch-signal lines. The base plate comprises four edge frame parts. The four edge frame parts being arranged in a manner that two are opposite to each other and the other two are opposite to each other. The scan driving circuit and the data line driving chip are respectively set on two opposite ones of the edge frame parts or the same one of the edge frame parts of the base plate.

In the above, the plurality of scan lines, the plurality of data lines, and the touch signal lines are located on different layers and the plurality of scan lines, the plurality of data lines, and the plurality of touch signal lines are stacked, in sequence, on the base plate.

In the above, the base plate comprises a plurality of pixel units arranged thereon in an array. Each of the data lines corresponds to one row of the pixel units and is connected, via a through hole, to each of the pixel units of the row of the pixel units. The scan lines and the non-touch-signal-transmitting lines are connected through a via.

In the above, the non-touch-signal lines comprise a curved section and a straight line section connected to the curved section. The straight line section has an orthogonal projection that is coincident with the data lines in a vertical direction. The via is located in the curved section. The curved section curves and detours around the through hole.

In the above, the scan lines and the non-touch-signal-transmitting lines further comprise a plurality of connection layers arranged therebetween. Each of the connection layers is set at a connection between the scan lines and the non-touch-signal-transmitting lines, such that the scan lines and the non-touch-signal-transmitting lines are connected through the connection layers.

In the above, the data lines and the connection layers are located on the same layer and formed in the same step of operation.

In the above, the base plate further comprises an effective display zone. The four edge frame parts surround the effective display zone.

In the above, the ones of the edge frame parts that are other than the one that is provided with the scan driving circuit and/or the data line driving chip have a width that is 0.1 mm-0.3 mm.

The present invention also provides a display panel. The display panel comprises a color filter substrate, the above-described array substrate, and a liquid crystal layer arranged between the color filter substrate and the array substrate.

The present invention further provides a display device, which comprises a display device body and the above-described display panel. The display panel is arranged on the display device body. The array substrate provided in the present invention is such that non-touch-signal-transmitting lines that are parallel to data lines are connected with scan lines so as to fulfill electrical connection between the scan lines and a scan line driving circuit through the non-touchsignal-transmitting lines, whereby under such a condition that wiring included in an edge frame is reduced, the scan line driving circuit and a data line driving chip can be arranged on the same edge frame part or on two opposite edge frame parts to achieve further frame slimming for other edge frame parts that do not include the scan line driving circuit and the data line driving chip arranged thereon.

BRIEF DESCRIPTION OF THE DRAWINGS

To more clearly explain the structural features and advantages of the present invention, a detailed description will be given below with reference to the attached drawings and an embodiment thereof.

DETAILED DESCRIPTION OF THE PREFERRED EMBODIMENTS

A clear and complete description will be given below to a technical solution provided by an embodiment of the present invention with reference to the attached drawings of the embodiment of the present invention. However, the attached drawings are provided for an example of illustration and are depicted as schematic views, and should not be construed as a constraint to the patent scope of this invention.

Figure 1:
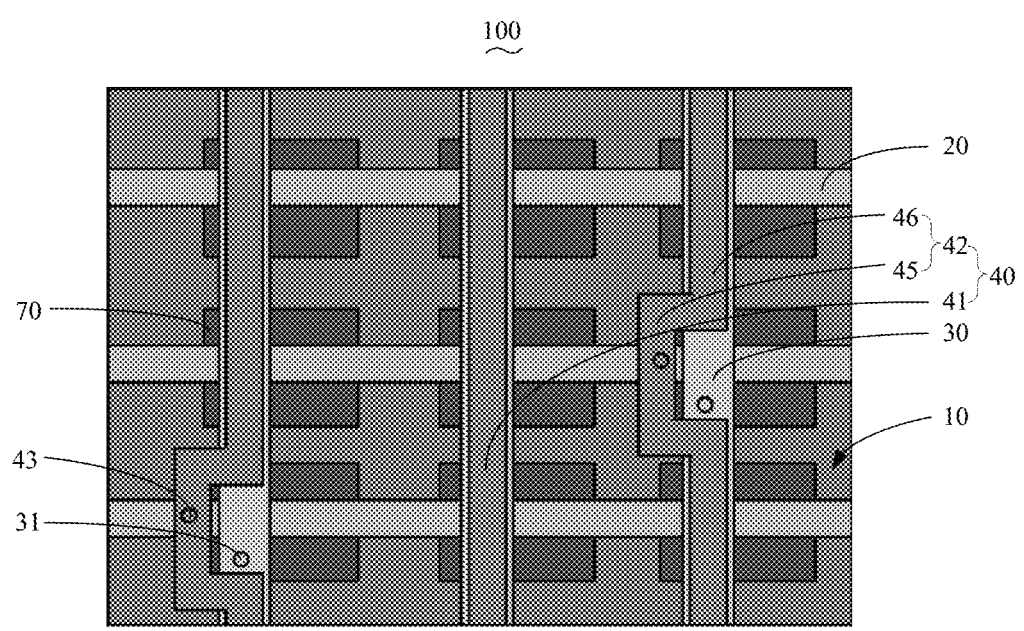
FIG. 1 is a schematic view illustrating an array substrate according to the present invention.
Figure 2:
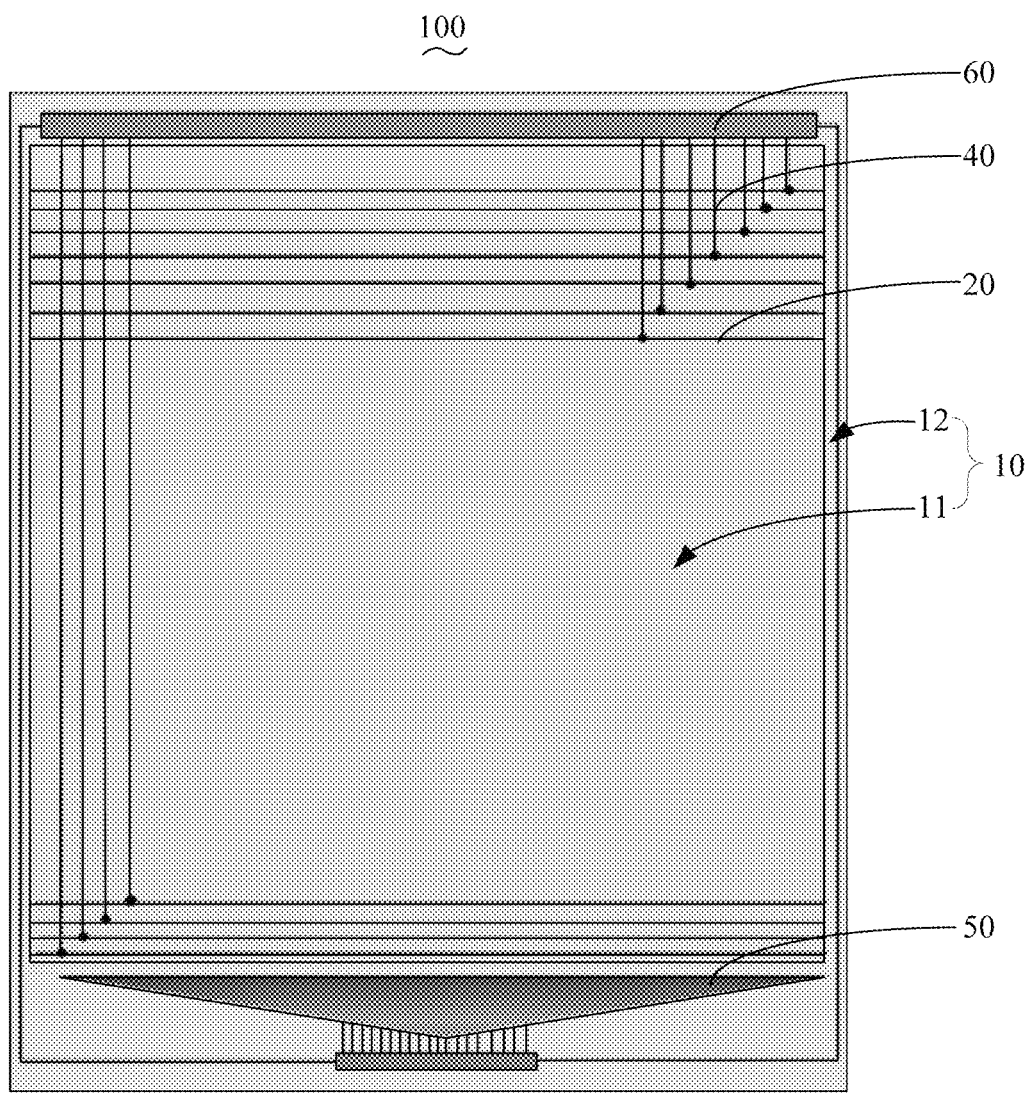
FIG. 2 is a schematic view illustrating a structure of the array substrate of the present invention.
Figure 3:
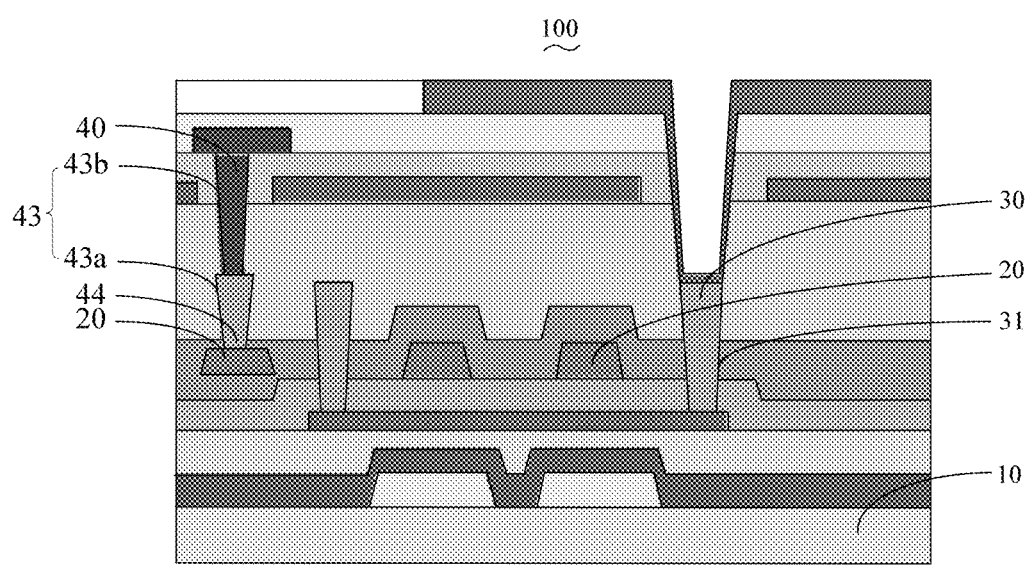
FIG. 3 is a schematic view, in a sectioned form, illustrating the array substrate of the present invention.

Referring collectively to FIGS. 1-3, the present invention provides an array substrate 100. The array substrate 100 comprises a base plate 10 and a plurality of scan lines 20 that are spaced from and parallel to each other, a plurality of data lines 30 that are spaced from and parallel to each other, a plurality of touch signal lines 40 that are spaced from each other, a data line driving chip 50, and a scan line driving circuit 60 that are arranged on the base plate 10. In the instant embodiment, the scan lines 20, the data lines 30, and the touch signal lines 40 are arranged to stack, in sequence, on the base plate 10. The scan lines 20 and the data lines 30 are arranged to intersect each other. In the instant embodiment, the scan lines 20 and the data lines 30 are perpendicular but not connected to each other.

In addition, the array substrate 100 further comprises a plurality of pixel units 70 that are arranged in an array on the base plate 10. Each of the pixel units 70 is set at an intersection point between the scan lines 20 and the data lines 30. Each of the pixel units 70 comprises a pixel electrode and a pixel switch electrically connected to the pixel electrode. The pixel switch comprises a gate electrode, a source electrode, and a drain electrode. The drain electrode is electrically connected to the pixel electrode to achieve the connection between the pixel electrode and the pixel switch.

The base plate 10 comprises an effective display zone 11 and four edge frame parts 12 that surround the effective display zone 11. The effective display zone 11 is operable for displaying an image. The edge frame parts are provided for wiring or arrangement of the data line driving chip 50 and/or the scan line driving circuit 60. The four edge frame parts 12 include a left edge frame part, a right edge frame part, an upper edge frame part, and a lower edge frame part. The left edge frame part is opposite to the right edge frame part. The upper edge frame part and is opposite to the lower edge frame part.

Multiple ones of the parallel scan lines 20 are arranged on the base plate 10. The scan lines 20 are electrically connected to the gate electrodes of the pixel switches to supply a scan voltage to the pixel units 70 to realize opening or closing of the pixel switch.

Multiple ones of the parallel data lines 30 are arranged on the base plate 10. Multiple ones of the parallel data lines 30 and multiple ones of the parallel scan lines 20 are arranged to perpendicular to each other. In the instant embodiment, the data lines 30 and the scan lines 20 are located on different layers, and the data lines 30 are stacked above the scan lines 20. It is appreciated that, in other embodiments, the data lines 30 can alternatively located under the scan lines 20. The scan lines 30 are electrically connected to the source electrodes of the pixel switches. In the instant embodiment, the scan lines 30 and the source electrodes are electrically connected by way of through holes 31. When the pixel switch is closed, the source electrode and the drain electrode of the pixel switch are conducted with each other so that a data signal is supplied through the data lines 30 to the pixel electrodes.

Further, the array substrate 100 according to the present invention further comprises a plurality of touch signal lines 40 that are spaced from each other. Multiple ones of the spaced touch signal lines 40 are located on the base plate 10. The touch signal lines 40 and the data lines 30 correspond to each other in a one to one manner, and the touch signal lines 40 are stacked on the data lines 30. In the present invention, the plurality of touch signal lines 40 include multiple touch-signal-transmitting lines 41 and multiple non-touch-signal-transmitting lines 42. The touch-signal-transmitting lines 41 transmit a touch signal, while the non-touch-signal-transmitting lines 42 do not transmit a touch signal. In the prior art, the non-touch-signal-transmitting lines 42 that do not transmit the touch signal are preserved for the purposes of ensuring better optical performance of a panel that includes the array substrate 100. In the instant embodiment, the touch-signal-transmitting lines 41 and the data lines 30 are parallel and orthogonal projections of the touch-signal-transmitting lines 40 in the vertical direction are coincident with the data lines 30, respectively, so as not to increase the aperture ratio of the pixel units 70; and the non-touch-signal-transmitting lines 42 each comprise a curved section 45 and a straight line section 46 connected to the curved section 45. The straight line section 46 is parallel to and coincident with the data lines 30. It is appreciated that the non-touch-signal-transmitting lines 42 may each comprise just the straight line section, meaning the non-touch-signal-transmitting lines 42 are of the same structure as that of the touch-signal-transmitting lines 41 and are parallel with the data lines 30.

In the present invention, each of the scan lines 20 is electrically connected to at least one of the non-touch-signal-transmitting lines 42, so that the scan voltage can be transmitted through the non-touch-signal-transmitting lines 42 to the scan lines 20. In the instant embodiment, each of the scan lines 20 is electrically connected to one of the non-touch-signal-transmitting lines 42. The array substrate 100 further comprises a plurality of connection layers 44. The plurality of connection layers 44 and the data lines 30 are located on the same layer and are formed through the same step of operation. Further, each of the connection layers 44 is set at a connection site between the non-touch-signal-transmitting lines 42 and the scan lines 20, and the connection layers 44 are arranged between the non-touch-signal-transmitting lines 42 and the scan lines 20. The connection layers 44 are electrically connected to the nontouch-signal lines 42 and the scan lines 20 are electrically connected to the connection layers 44, so that the connection layers 44 provide electrical connection between the non-touch-signal lines 42 and the scan lines 20. In the instant embodiment, the non-touch-signal-transmitting lines 42 and the scan lines 20 are electrically connected to each other through vias 43. The vias 43 each comprise a first via 43a and a second via 43b. The connection layers 44 are electrically connected to the scan lines 20 through the first vias 43a and the non-touch-signal lines 42 are connected, through the second via 43b, to the connection layers 44 so as to achieve electrical connection between the non-touch-signal-transmitting lines 42 and the scan lines 20 through the vias. In the present invention, the connection layers 44 are connected the non-touch-signal lines 42 and the scan lines 20 respectively by way of the first vias 43a and the second vias 43b to achieve the electrical connection between the non-touch-signal lines 42 and the scan lines 20, so as to prevent a distance between the non-touch-signal lines 42 and the scan lines 20 from getting large. To fulfill the electrical connection through one via, the via may need to have an excessively large depth that might cause issues of poor contact.

Further, the via 43 through which the non-touch-signal-transmitting lines 42 and the scan lines 20 are electrically connected is located in the curved section 45 of the non-touch-signal-transmitting lines 42, meaning the location where the non-touch-signal-transmitting lines 42 and the scan lines 20 are electrically connected to each other through the via is on the curved section 45, so that when the non-touch-signal-transmitting lines 42 are electrically connected to the scan lines 20, the non-touch-signal-transmitting lines 42 detour round the through holes 31, and the location where the non-touch-signal lines 42 are electrically connected to the scan lines 20 is not coincident with the data lines 30 in the vertical direction to prevent conduction, and thus shorting from occurring between the scan lines 20 and the data lines 30. It is appreciated what when the non-touch-signal-transmitting lines 42 comprise only the straight line section 46, the non-touch-signal-transmitting lines 42 are parallel to the data lines 30 but have orthogonal projections that are not coincident with the data lines 30 in the vertical direction in order to ensure the location where the non-touch-signal lines 42 are electrically connected to the scan lines 20 is not coincident with the data lines 30 in the vertical direction thereby preventing conduction, and thus shorting from occurring between the scan lines 20 and the data lines 30.

The data line driving chip 50 comprises a plurality of pins and each of the pins are corresponding, in a one to one manner, to and electrically connected to the plurality of spaced and parallel data lines 30. The data line driving chip 50 supplies, the data signal, through the data lines 30 to the pixel electrodes. The scan line driving circuit 60 comprises a plurality of pins and the pins are electrically connected to the non-touch-signal-transmitting lines 42 that are electrically connected to the scan lines 20. In the instant embodiment, the scan lines 20 are corresponding, in a one to one manner, to the non-touch-signal-transmitting lines 42, and the pins of the scan line driving circuit 60 are corresponding, in a one to one manner, and electrically connected to the non-touch-signal-transmitting lines 42. In other embodiments, one of the scan lines is electrically connected to multiple ones of the non-touch-signal-transmitting lines 42 and the multiple ones of the non-touch-signal-transmitting lines that are electrically connected to the scan line are connected to each other first and then connected to one of the pins of the scan line driving circuit 60. The scan driving circuit 60 supplies the scan signal through the non-touch-signal-transmitting lines 42 to the scan lines, in order to control opening and closing of the pixel electrode. In the instant embodiment, to ensure a better appearance of the array substrate, the data line driving chip 50 is arranged on the lower edge frame part 15, and the scan driving circuit 60 is arranged on the upper edge frame part 14, so that the left edge frame part 12 and the right edge frame part 13 are allowed to reduce to the extreme to fulfill an ultra slim design of the left edge frame part 12 and the right edge frame part 13. It is appreciated that the data line driving chip 50 may alternatively be arranged on the left edge frame part 12 and the scan driving circuit 60 be arranged on the right edge frame part 13; or alternatively, the data line driving chip 50 and the scan driving circuit 60 are both located on any one of the edge frame parts, such as the left edge frame part 12, the right edge frame part 13, the upper edge frame part 14, or the lower edge frame part 15, so that the other three edge frame parts may achieve the ultra slim design.

Further, in the present invention, the array substrate 100 may adopt fabrication of method and process that are the same as the prior art so that repeated description will be omitted herein. However, the present invention is different from the prior art in that a pattern of a mask used to form the data lines 30 is modified such that the connection layers 44 are formed at the same time when the data lines 30 are formed, and further, a pattern of a mask used to form the touch signal lines 40 is changed such that the touch-signal-transmitting lines 41 and the non-touch-signal-transmitting lines 42 of the present invention can be formed at the same time. Thus, without additionally increasing the operations of fabrication of the array substrate, the array substrate 100 according to the present invention can be made.

In the present invention, by arranging the non-touch-signal-transmitting lines 42 that do not provide a function of transmitting a touch signal to electrically connect with the scan lines 20 and making the non-touch-signal-transmitting lines 42 electrically connected to the scan driving circuit 60, electrical connection between the scan lines 20 and the scan driving circuit 60 can be achieved with the non-touch-signal-transmitting lines 42 to thereby allow the scan driving circuit 60 and the data line driving chip 50 to be separately set at two opposite edge frame parts, or the same edge frame part, of the base plate 10. Thus, edge frame ultra slimming for the edge frame parts other than the one that is provided with the scan driving circuit 60 and/or the data line driving chip 50 can be fulfilled. In the instant embodiment, the edge frame parts other than the one that is provided with the scan driving circuit and/or the data line driving chip have a width of 0.1 mm-0.3 mm.

The present invention also provides a display panel. The display panel comprises a color filter substrate, the array substrate 100 that is described above and a liquid crystal layer arranged between the color filter substrate and the array substrate 100.

The present invention further provides a display device. The display device can be a device that is used to display an image and also allows for touch control to be conducted on a panel thereof, such as a mobile phone, a tablet device or a television, or a computer. The display device comprises a display device body and the above-described display panel. The display panel is arranged on the display device body.

The above provides preferred embodiments of the present invention. It is noted that for those having ordinary skills of this technical field improvements and modifications can be made without departing from the principle of the present invention. Such improvements and modifications are considered falling within the scope of protection of the present invention.

What is claimed is:

1. An array substrate, comprising:
   a base plate;
   a plurality of spaced and parallel scan lines, which are arranged on a surface of the base plate;
   a plurality of spaced and parallel data lines, which are arranged on the base plate, the plurality of data lines and the plurality of scan lines being perpendicular but not connected to each other;
   a plurality of spaced touch signal lines, the plurality of touch signal lines being located on the base plate, the touch signal lines corresponding, in a one to one manner, to and parallel with the data lines, the plurality of touch signal lines comprising multiple non-touch-signal-transmitting lines, each of the scan lines being electrically connected to at least one of the non-touch-signal-transmitting lines;
   a data line driving chip, the data line driving chip comprising pins that correspond, in a one to one manner, to and are electrically connected to the plurality of data lines; and
   a scan line driving circuit, the scan driving circuit comprising pins that are electrically connected to the non-touch-signal lines;
   wherein the base plate comprises four edge frame parts, the four edge frame parts being arranged in a manner that two are opposite to each other and the other two are opposite to each other, the scan driving circuit and the data line driving chip being respectively set on two opposite ones of the edge frame parts or the same one of the edge frame parts of the base plate;
   wherein the plurality of scan lines, the plurality of data lines, and the touch signal lines are located on different layers and the plurality of scan lines, the plurality of data lines, and the plurality of touch signal lines are stacked, in sequence, on the base plate;
   wherein the base plate comprises a plurality of pixel units arranged thereon in an array, each of the data lines corresponding to one row of the pixel units and connected, via a through hole, to each of the pixel units of the row of the pixel units, the scan lines and the non-touch-signal-transmitting lines being connected through a via; and
   wherein the non-touch-signal lines comprise a curved section and a straight line section connected to the curved section, the straight line section having an orthogonal projection that is coincident with the data lines in a vertical direction, the via being located in the curved section, the curved section curving and detouring around the through hole.

2. The array substrate according to claim 1, wherein the scan lines and the non-touch-signal-transmitting lines further comprise a plurality of connection layers arranged therebetween, each of the connection layers being set at a connection between the scan lines and the non-touch-signal-transmitting lines, such that the scan lines and the non-touch-signal-transmitting lines are connected through the connection layers.

3. The array substrate according to claim 2, wherein the data lines and the connection layers are located on the same layer and formed in the same step of operation.

4. The array substrate according to claim 1, wherein the base plate further comprises an effective display zone, the four edge frame parts surrounding the effective display zone.

5. The array substrate according to claim 4, wherein the ones of the edge frame parts that are other than the one that is provided with the scan driving circuit and/or the data line driving chip have a width that is 0.1 mm-0.3 mm.

* * * * *